United States Patent [19]

Montgomery

[11] E Patent Number: Re. 32,648

[45] Reissued Date of Patent: Apr. 19, 1988

[54] OPAQUE PROJECTOR

[75] Inventor: John R. Montgomery, Fairfield, Conn.

[73] Assignee: Constantin Systems, Inc., Chicago, Ill.

[21] Appl. No.: 900,322

[22] Filed: Aug. 25, 1986

Related U.S. Patent Documents

Reissue of:

[64] Patent No.: 4,468,105
Issued: Aug. 28, 1984
Appl. No.: 366,424
Filed: Apr. 7, 1982

[51] Int. Cl.[4] ..... G03B 21/06

[52] U.S. Cl. ..... 353/66; 353/72; 353/79; 353/119

[58] Field of Search ..... 353/66, 72, 79, 63, 353/65, 67, 64, 73, 98, DIG. 4, 75, 71, 122, 119; 352/104, 202, 34, 242; 362/373

[56] References Cited

U.S. PATENT DOCUMENTS

| | | | |
|---|---|---|---|
| Re. 28,274 | 12/1974 | Altman . | |
| 1,202,754 | 10/1916 | Patterson . | |
| 1,224,663 | 5/1917 | Patterson | 353/64 |
| 1,485,147 | 2/1924 | Patterson . | |
| 1,771,509 | 7/1930 | Ott | 353/52 |
| 1,988,522 | 1/1935 | Stanley . | |
| 2,016,188 | 10/1935 | Watkins | 353/119 X |
| 2,395,561 | 2/1946 | Osterberg et al. . | |
| 2,517,387 | 8/1950 | Cunningham et al. | 352/34 |
| 2,596,393 | 5/1952 | Fitzgerald . | |
| 2,847,901 | 8/1958 | Sassaman et al. . | |
| 3,190,174 | 6/1965 | Field . | |
| 3,257,898 | 6/1966 | Webb . | |
| 3,366,005 | 1/1968 | Benedict . | |
| 3,512,883 | 5/1970 | Noble . | |
| 3,752,574 | 8/1973 | Kato et al. . | |
| 3,778,142 | 12/1973 | Altman . | |
| 3,837,739 | 9/1974 | Altman . | |
| 3,900,253 | 8/1975 | Astero . | |
| 3,915,567 | 10/1975 | Altman . | |
| 3,947,103 | 3/1976 | Altman . | |
| 3,951,535 | 4/1976 | Altman . | |

FOREIGN PATENT DOCUMENTS

| | | | |
|---|---|---|---|
| 23138 | 10/1929 | Australia | 352/104 |
| 172201 | 7/1960 | Sweden . | |
| 3544 | of 1914 | United Kingdom . | |
| 385104 | 12/1932 | United Kingdom . | |

*Primary Examiner*—Harry N. Haroian
*Attorney, Agent, or Firm*—Willian Brinks Olds Hofer Gilson & Lione Ltd.

[57] ABSTRACT

A portable opaque projector is characterized by a transportable mode and an operable mode. When in its transportable mode, the projector has the configuration of a compact hexahedron; when in its operable mode the top and sides of the projector are opened up, and a mirror is mounted to the top.

23 Claims, 2 Drawing Sheets

OPAQUE PROJECTOR

Matter enclosed in heavy brackets [ ] appears in the original patent but forms no part of this reissue specification; matter printed in italics indicates the additions made by reissue.

BACKGROUND OF THE INVENTION

This invention relates to episcopic image projection systems, i.e., projection systems which reflect light from a graphic sheet onto a screen or other suitable surface. Such systems are distinguished from diascopic image projection systems wherein light passes through the graphic sheet en route to the screen. Because light in the episcopic system does not have to pass through the graphic sheet, opaque graphic sheets rather than transparent graphic sheets can be utilized. For this reason episcopic image projection systems are commonly referred to as opaque projectors.

Opaque projectors have the inherent advantage that plain paper graphics, and even three-dimensional objects, can be projected without special preparation. This, of course, eliminates the time and expense needed to prepare transparencies of each graphic which are required in diascopic image projection systems. Moreover, the use of plain paper graphics in opaque projectors gives the user an element of spontaneity and versatility during a visual presentation which is not available in diascopic systems.

In spite of their many benefits, opaque projectors have had limited commercial acceptance and success. Numerous factors such as coat, size, weight, operation difficulties, image diffusion and the like may account for this situation. Accordingly, there have been several attempts over the years to produce a compact, opaque projector which is capable of achieving excellent optical results. Some of these attempts are described in U.S. Pat. Nos. 3,947,103; 3,951,535; 3,915,5667; 3,837,739; 3,778,142; and Re. 28,274. Other image projection systems are disclosed in U.S. Pat. Nos. 3,900,253; 3,752,574; 3,257,898; 3,366,005; and 3,190,174. Nonetheless, the marketplace remains in need of an improved high quality, portable opaque projector.

Accordingly, it is a primary object of this invention to provide an improved opaque projector. Another object of this invention is the provision of such a projector which is sufficiently compact and portable as to enable it to be readily stored and transported yet sufficiently uncomplicated as to be easy to assemble and use. Other objects, features and advantages of the invention will become apparent hereinafter.

SUMMARY OF THE INVENTION

The objects, features and advantages of the invention are achieved in an opaque projector characterized by a transportable mode and an operable mode. The projector comprises case means including end panels, side panels, a base and a top. The top is in a closed position when the projector is in its transportable mode, and an open position when the projector is in its operable mode. Mechanical means, cooperating with the top, enable the top to be maintained in its open position at a first acute angle relative to the plane defined by the top when the top is in its closed position, and mounting means hold a mirror adjacent the top at a second acute angle with the plane defined by the top in its closed position when the projector is in its operable mode.

In another aspect of the invention, there is a method for converting an opaque projector, characterized by case means having end panels, side panels, a base and a top, from a transportable mode to an operable mode. The method comprises moving the top from a closed position to an open position wherein the plane of the top forms an acute angle with the plane of the top in the closed position; maintaining the top in the open position; and removing a mirror from a stowed position inside the case to a mounted position adjacent the top.

In other aspects of the invention, the sides of the projector and platen extension members swing out to provide access to a graphic supporting platen. Other aspects of the invention, including numerous features and advantages, are explained in greater detail hereinafter.

DETAILED DESCRIPTION OF THE DRAWINGS

The preferred embodiment of the invention summarized above is illustrated in the accompanying drawings wherein.

DETAILED DESCRIPTION OF THE PREFERRED EMBODIMENT OF THE INVENTION

Figure 1:
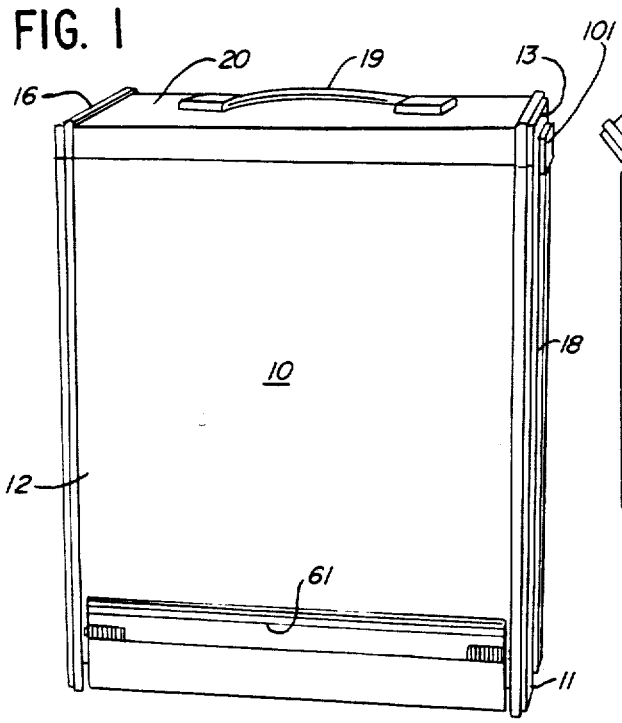
FIG. 1 is a schematic, perspective view of an improved opaque projector in its transportable mode.

Referring now to FIG. 1, the preferred embodiment of an improved opaque projector is identified by reference numeral 10. Projector 10 is illustrated in FIG. 1 in a closed configuration, said closed configuration sometimes being referred to herein as a transportable mode. In this mode projector 10 has the shape of a hexahedron, and is of compact size having typical dimensions as follows: length=20", width=15", height=8½". Projector 10 is preferably characterized by a rectangular base 11, a pair of side panels 12 preferably extending perpendicularly to the plane of base 11, the planes defined by side panels 12 being parallel to one another when projector 10 is in its transportable mode. A graphic suport platen 60, shown best in FIG. 2, is disposed inside projector 10 above base 11.

Projector 10 further includes a rear panel 16 and a front panel 18, each of said panels preferably extending substantially perpendicularly to the plane of base 11. The planes defined by rear panel 16 and front panel 18, like the planes defined by side panels 12, are preferably parallel to one another when projector 10 is in its transportable mode. A conventional latch 101, mounted to a forward surface 13 of top 20, serves to releasably maintain projector 10 in its transportable mode, and a handle 19, secured to top 20, facilitates carrying and handling of projector 10 in that mode.

Figure 3:
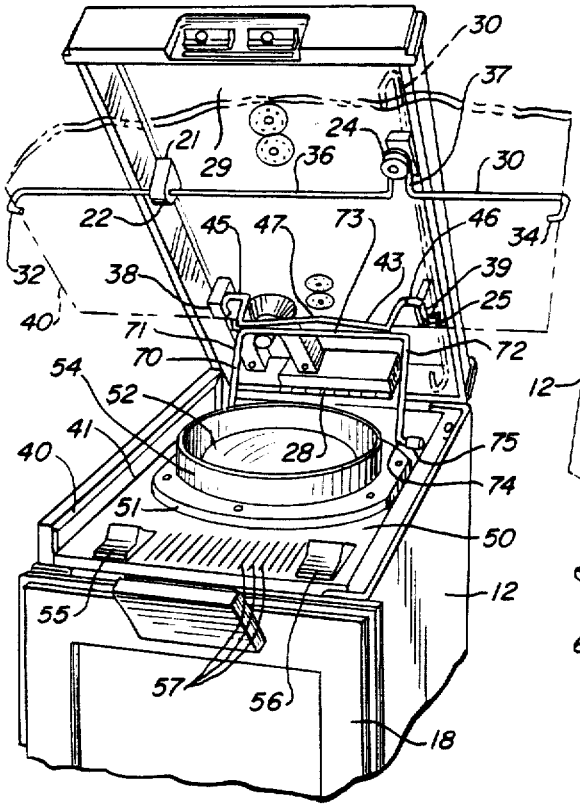
FIG. 3 is an enlarged, perspective view, with a portion partially cutaway, of the upper portion of the opaque projector shown in FIG. 2.
Figure 2:
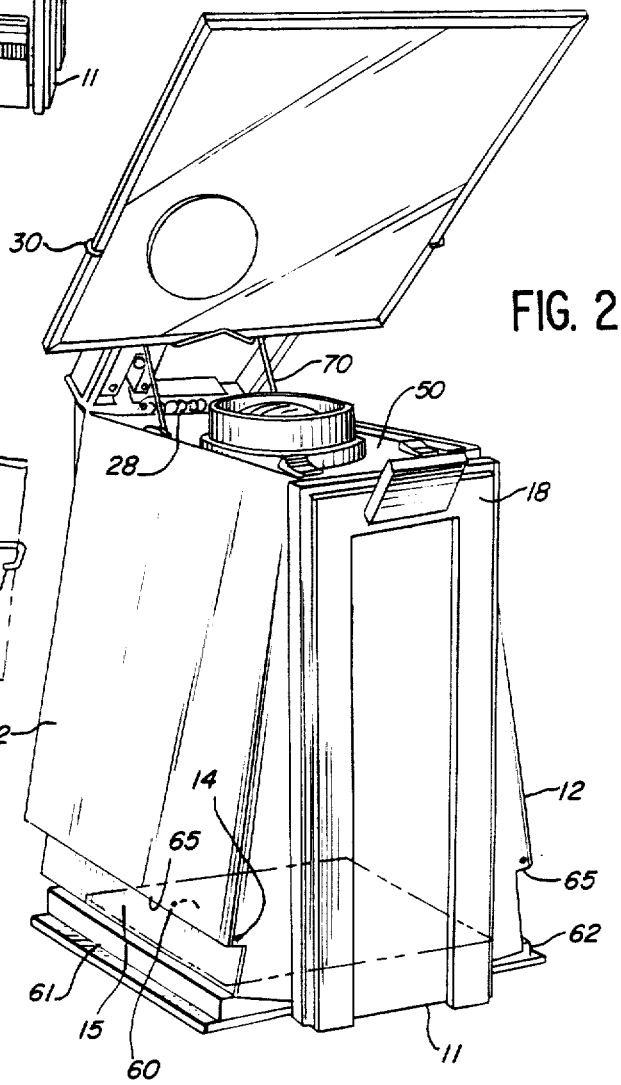
FIG. 2 is a schematic perspective view of the opaque projector shown in FIG. 1 in its operable mode.

Projector 10 is readily changed from its transportable mode to an operable mode illustrated schematically in FIGS. 2 and 3. The most salient aspects of this operable mode are that top 20 is opened and maintained at an acute angle relative to its original position, and sides 12 are likewise opened and maintained at an acute angles relative to their original positions. Other features of the operable mode of projector 10 will be explained hereinafter.

Top 20 is opened by undoing latch 101, and then swinging top 20 upwardly about a hinge 28 which interconnects top 20 to rear panel 16. A generally U-shaped top bail 70 serves to support top 20 in its opened position. Top bail 70 is preferably of wire-like construction and includes a center section 73 interconnecting a pair of leg sections 71,72. Leg sections 71,72 terminate at a pair of end sections, one of which is identified by reference numeral 74. End sections 74 engage a corresponding pair of brackets one of which is identified by reference numeral 75. When so engaged, top bail 70 can be swiveled from a stowed position wherein it may lie substantially parallel to the plane defined by a mounting plate 50 inside projector 10, to a top supporting position wherein center section 73 supports top 20 at an acute angle as shown in FIG. 3.

Figure 7:
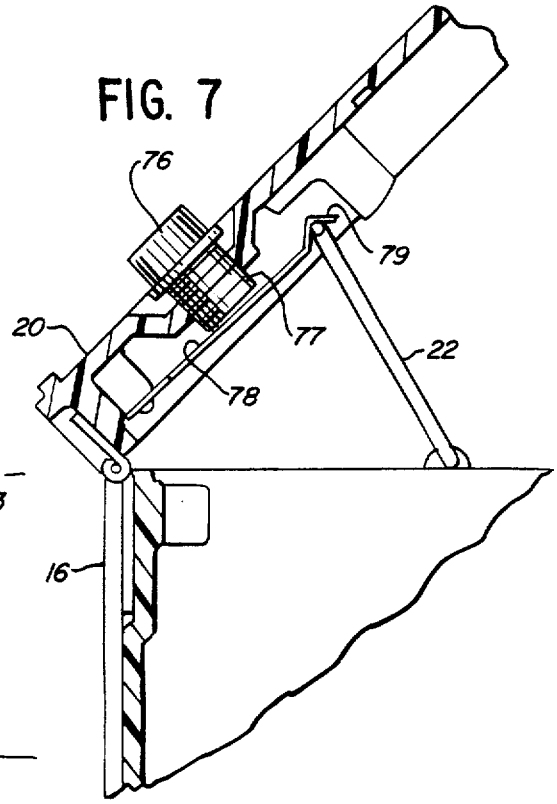
FIG. 7 is an enlarged, perspective view of a portion of the opaque projector shown in FIG. 5.

The acute angle which top 20 makes with mounting plate 50 can be adjusted by means of a screw 77 which bears against a hinged plate 78 shown best in FIG. 7. Hinged plate 78 defines a detent 79 which accommodates the center section 73 of top bail 70. By advancing screw 77 via a knob 76 disposed on the outer surface of top 20, hinged plate 78 pivots inwardly causing top bail 70 to switch toward rear panel 16. This, in turn, urges top 20 upwardly, thereby increasing the angle between top 20 and mounting plate 50. Likewise, by retracting screw 77, the angle between top 20 and mounting plate 50 will necessarily decrease.

The interior of projector 10 includes means defining a compartment 41 for storing a mirror 40. As shown in FIG. 3, mirror 40 is identified by solid lines in its stowed position, and by dashed lines in its operable position. In this particular embodiment, compartment 41 is adjacent one of side panels 12, whereby the plane of mirror 40, when stowed in compartment 41, is parallel with the plane defined by side panels 12 when projector 10 is in its transportable mode. When projector 10 is in its operating mode, mirror 40 is mounted adjacent the opened top 20 of projector 10.

Mirror 40 is maintained in position adjacent top 20, at least in part, by a mirror support 43. In this embodiment mirror support 43 includes a wire-like member having a pair of angled terminating sections 45,46 interconnected by an intermediate section 47. As shown best in FIG. 3, angled terminating sections 45,46 are mounted, respectively, in support blocks 38,39 which are, in turn, secured to the interior surface of top 20 at or near opposite sides thereof.

The intermediate section 47 of mirror support 43 is preferably configured in an inverted "V" shape so that intermediate section 47, particularly those portions adjacent the apex of the inverted "V" shape thereof, lie in a plane perpendicular to the planes defined by the terminating sections 45,46. Thus, when mirror support 43 is properly mounted, the inverted "V" shape of intermediate section 47 protrudes upwardly to prevent mirror 40 from inadvertantly sliding forwardly off the terminating sections 45,46 on which it rests. Terminating sections 45, 46 are, of course, of sufficient size to accomodate the bottom edge of mirror 40.

Mirror 40 is preferably further maintained in position adjacent top 20 through use of a "tongue and slot" arrangement. For example, a downwardly extending sheet metal tongue or flange identified by reference numeral 33 in FIG. 5 may be secured to the rear surface of mirror 40, and a mating slot 29 may be formed in the front edge of top 20 as shown in FIG. 3. Slot 29 is adapted to receive and hold the downwardly extending flange 33, thereby assuring that mirror 40 will be maintained in proper position when projector 10 is in its operable mode.

Alternatively, mirror 40 may be maintained in position adjacent top 20 by a mirror bail 30, particularly if mirror 40 is to be mounted with its length extending beyond the side edges of top 20. Mirror bail 30 is preferably of wire-like construction and, as shown in FIG. 3, includes a pair of hooks 32,34 interconnected by an intermediate portion 36. Hooks 32,34 are dimensioned so that the gaps defined thereby are only slightly wider than the side edges of mirror 40, thereby permitting hooks 32,34 to captivate said edges when mirror bail 30 is mounted. A loop portion 37 is formed in intermediate portion 36 preferably closer to hook 34 than hook 32. The plane defined by loop portion 37 of mirror bail 30 is preferably perpendicular to the plane defined by hooks 32,34.

Mounted to the interior surface of top 20, preferably adjacent one side thereof, is a mirror bail support 21 having a pair of jaws 22 preferably separated by a gap slightly smaller than the thickness of a facing portion of intermediate portion 36 of mirror bail 30. Thus, when mirror bail 30 is mounted for use in maintaining mirror 40 in proper position, the facing portion of intermediate portion 36 of mirror bail 30 is inserted between jaws 22 of bail support 21 and captivated thereby. Also mounted on the interior surface of top 20, preferably adjacent the side opposite the side where mirror bail support 21 is mounted, is a mirror bail retention piece 24. Retention piece 24 is preferably of disc-like configuration having a radius substantially the same as the radius of loop portion 37 of mirror bail 30. When mirror bail 30 is mounted for use in maintaining mirror 40, loop portion 37 is moved into mating engagement with retention piece 24, thereby captivating the same. With loop portion 37 captivating retention piece 24, and jaws 22 of mirror bail support 21 captivating the facing portion of intermediate portion 36, mirror bail 30 is securely mounted to top 20. Mirror 40 can then be maintained in position by utilizing hooks 32,34 to captivate the side edges of mirror 40.

When mirror bail 30 is not mounted for use in maintaining mirror 40 in position, it is preferably stowed along the side of the interior surface of top 20 adjacent retention piece 24. Mirror bail 30 can be so stowed, by orienting hooks 32,34 so that the plane defined thereby is perpendicular to the plane defined by top 20. When oriented in this manner, loop portion 37 of mirror bail 30 captivates retention piece 24, and a clasp 25, preferably mounted to the interior surface of top 20 along the same side thereof as retention piece 24, captivates a portion of intermediate portion 36 of mirror bail 30. The stowed position of mirror bail 30 is identified by dashed lines in FIG. 3.

Figure 5:
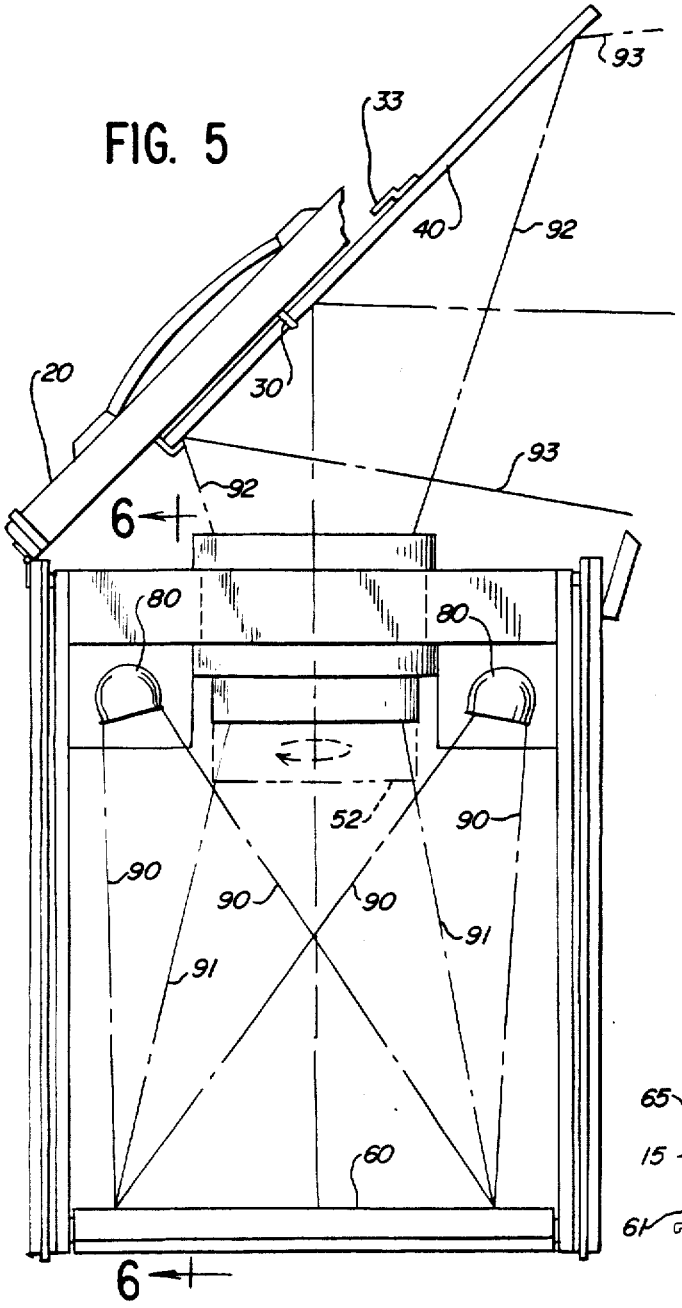
FIG. 5 is an enlarged side view of the opaque projector shown in FIG. 2 with a portion removed to illustrate the light paths associated with imaging a graphic sheet by said projector.
Figure 6:
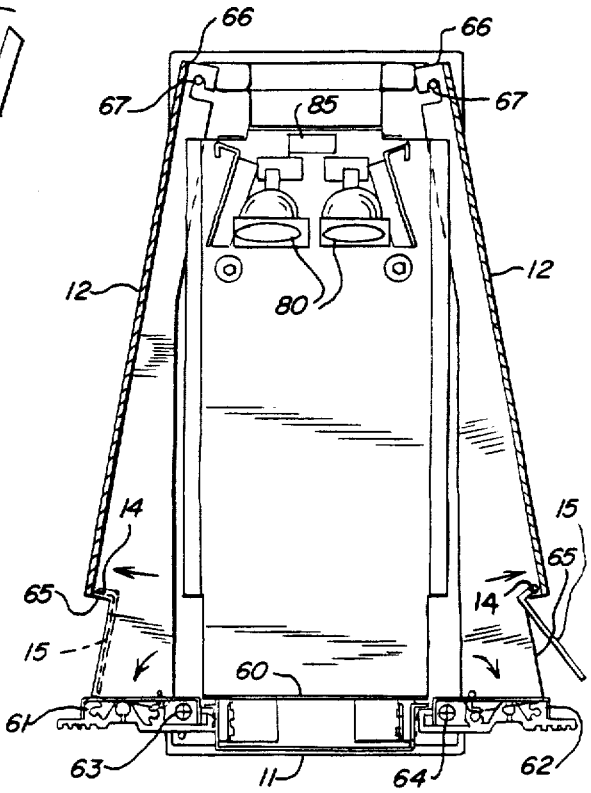
FIG. 6 is a sectional view of said opaque projector taken along lines 6—6 of FIG. 5.

As mentioned above, the operable mode of projector 10 also involves moving side panels 12 from an original closed position shown in FIG. 1 to an open position shown in FIGS. 2 and 6. This is preferably achieved by lowering a pair of platen extension members 61,62 about respective pivots 63,64 from the vertical or upright position of FIG. 1, to the horizontal or flat position of FIGS. 2 and 6. When moved to the latter position, platen extension members 61,62 are substantially coplaner with graphic support platen 60. Similarly, the upper ends of each of side panels 12 preferably include a pivot arm 66 adapted to swivel about respective pivots 67 from the closed position shown in FIG. 1 to the open position shown in FIGS. 2–6. Side panels 12 are maintained in said open position by detents (not shown) or any other suitable means.

When side panels 12 are moved to their open position, and platen extension members 61,62 are lowered, an opening 65 to the interior of projector 10 is defined by the bottom edges of side panels 12. Opening 65 provides access to platen 60, whereby a user of projector 10 can place any desired material to be projected, sometimes referred to herein as a graphic, onto platen 60. Opening 65 also provides communication between the interior of projector 10 and the ambient air to provide a path for dissipating hot air inside projector 10 in a manner described hereinafter. Platen 60 is preferably covered with heat insulating material such as felt, so it is not hot to the touch.

If desired, a pair of glare shielding flaps 15, may be secured by pivots 14 to corresponding side panels 12. This is shown best in FIG. 6, where one of flaps 15 is open and the other is closed. When closed, flaps 15 substantially shield the glare reflected off of the graphic on platen 60 which spectators may find annoying or distracting during a presentation using projector 10. Even when closed, however, opening 65 is not completely blocked, whereby air flow between the interior and exterior of projector 10 can be maintained.

Figure 4:
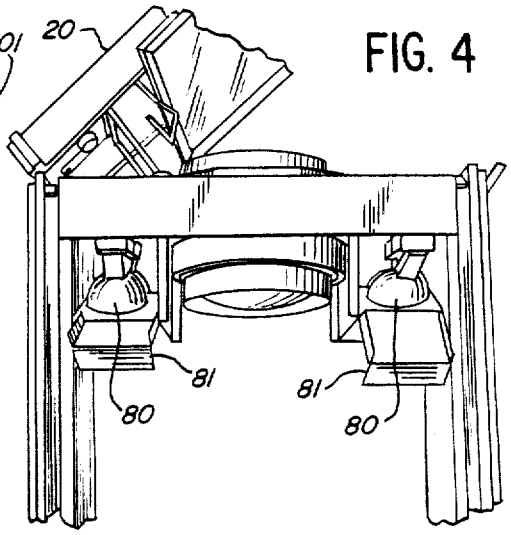
FIG. 4 is an enlarged, perspective view of the upper portion of the opaque projector shown in FIG. 2 with a portion removed to reveal the interior of said projector.

Referring again to FIG. 3, mounting plate 50 is seen to serve as an escutcheon for a lamp switch 55, a fan switch 56, and an optical lens 52 having a frame 54 and an optical axis 53 (FIG. 5). Preferably associated with frame 54 is a rotatable adjustment ring 51 for adjusting the focus of lens 52. Also disposed in mounting plate 50 are a plurality of air vents 57. Lamp switch 55 operates lamps 80 which are mounted immediately below mounting plate 50 as shown in FIGS. 4–6. Reflectors 81 serve to maximize the amount of light from lamps 80 toward graphic support platen 60. Similarly, fan switch 56 is connected to a pair of fans also disposed under mounting plate 50, one of said fans being shown in block form in FIG. 6, and being represented by reference numeral 85. Fan 85 is operable to dissipate air heated by lamps 80, by blowing hot air out of the confines of projector 10 via vents 57 (FIG. 3) and opening 65 (FIGS. 2 and 6).

The preferable operable mode of projector 10 can now be described. Top 20 is unlatched, opened and maintained in its open position by top bail 70. Mirror 40 is removed from compartment 41 and mounted on mirror support 43, the flange 33 at the rear of mirror 40 being preferably simultaneously inserted in slot 29. Side panels 12 are opened and platen extension members 61,62 are lowered to provide access to graphic support platen 60. A graphic may then be placed on graphic support platen 60.

A power cord (not shown) is removed from storage inside base 11 and appropriate connections to household current are made. Lamp switch 55 and fan switch 56 are then activated. The light paths from lamps 80 are illustrated schematically in FIG. 5. In particular, light from lamps 80 follows paths 90 toward graphic support platen 60. At least some of this light is reflected from the graphic to lens 52 via paths 91. The reflected light emerges from lens 52 and is passed to mirror 40 via paths 92. Light is then reflected off of mirror 40, and directed along paths 93 to a screen or other viewing surface. Of course lens 52 can be adjusted, if necessary, by means of an adjustment ring 51 to focus the image of the graphic onto the screen.

Projector 10 can, of course, be returned to its transportable mode simply by turning off switches 55,56, disconnecting the household current returning the power cord to its stored position, closing side panels 12, raising platen extension members, stowing mirror 40, and closing top 20.

In this preferred embodiment, lens 52 is a projection lens characterized by the following parameters: f=2.7, F.L.=14.5", Mag.=4–8:1. Mirror 40 is a first surface glass mirror. Lamps 80 are General Electric ENX 360 W, 82 V lamps, preferably operated in series with half wave rectifiers. Fan 85 is a Sprite Fan available from Rotron, Inc. of Woodstock, N.Y. Switches 56,57 are double-pole 10 amp switches available from McGill Elec. Products of Valparaiso, Ind.

What has been described is an improved opaque projector. Though the embodiment of the projector disclosed herein is preferred, numerous refinements, modifications and alterations will be apparent to those skilled in the art. Accordingly, all such refinements, modifications and alterations are intended to be covered by the appended claims.

I claim:

1. An opaque projector characterized by a transportable mode and an operable mode comprising:

case means including end panels, side panels, a base and a top, said top being in a closed position when said projector is in said transportable mode and an open position when said projector is in said operable mode;

mechanical means, cooperating with said top, enabling said top to be maintained in said open position at a first acute angle relative to the plane defined by said top in said closed position when said projector is in said operable mode; and mounting means for holding a mirror adjacent said top at a second acute angle with the plane defined by said top in said closed position when said projector is in said operable mode;

wherein said side panels are in a closed position when said projector is in said transportable mode, said side panels defining substantially parallel planes substantially perpendicular to said base when in said closed position;

at least one of said side panels being movably mounted to said case means, and being adapted to swing to an open position to form an acute angle with the plane defined by said one of said panels in said closed position, when said projector is in said operable mode.

2. The projector defined in claim 1 wherein said mechanical means include a top bail adapted to support said top in any one of a plurality of open positions.

3. The projector defined in claim 1 further including:

a graphic support platen adjacent said base and extending in a plane substantially parallel to the plane of said base; and platen extension means mounted to pivot relative to said graphic support platen, disposed in a raised position substantially parallel to the planes defined by said side panels when said side panels are in said closed position, and a lowered position substantially coplaner with said graphic support platen when said one of said side panels is in said open position.

4. The projector defined in claim 3 wherein said one of said side panels and said platen extension means define an opening for permitting the interior of said case means to communicate with the ambient air via said opening.

5. The projector defined in claim 4 wherein said opening provides access to said graphic support platen for placing a graphic thereon.

6. The projector defined in claim 4 further includes lamp means disposed inside said case means adapted to illuminate a graphic located on said graphic support means, and heat disipation means, disposed inside said case means, adapted to blow air heated by said lamp means out of said case means via said opening.

7. The projector defined in claim 3 further including flap means, secured to at least one of said panels, movable between open and closed positions; said flap means, when in its closed position, adapted to substantially block glare reflected from a graphic on said graphic support platen, yet maintaining an air flow path between the interior and exterior of said projector.

8. The projector defined in claim 1 further including:

lens means, having an optical axis, fastened inside said case means so that said axis is substantially perpendicular to the plane defined by said base.

9. The projector defined in claim 8 further including:

a graphic support platen adjacent said base and extending substantially parallel to the plane defined thereby; and lamp means secured inside said case adapted to illuminate a graphic disposed on said graphic support platen.

10. An opaque projector characterized by a transportable mode and an operable mode comprising:

case means including end panels, side panels, a base and a top, said top being in a closed position when said projector is in said transportable mode and an open position when said projector is in said operable mode;

mechanical means, cooperating with said top, enabling said top to be maintained in said open position at a first acute angle relative to the plane defined by said top in said closed position when said projector is in said operable mode; and mounting means for holding a mirror adjacent said top at a second acute angle with the plane defined by said top in said closed position when said projector is in said operable mode;

lens means, having an optical axis, fastened inside said case means so that said axis is substantially perpendicular to the plane defined by said base;

a graphic support platen adjacent said base and extending substantially parallel to the plane defined thereby;

lamp means secured inside said case adapted to illuminate a graphic disposed on said graphic support platen; and platen extension means pivotally mounted adjacent said base along at least one side of said case means, said platen extension means being disposed in a raised position substantially parallel to the planes defined by said side panels when said projector is in said transportable mode, and a lowered position substantially coplaner with said platen when said projector is in said operable mode.

11. An opaque projector characterized by a transportable mode and an operable mode comprising:

case means including end panels, side panels, a base and a top, said top being in a closed position when said projector is in said transportable mode and an open position when said projector is in said operable mode;

mechanical means, cooperating with said top, enabling said top to be maintained in said open position at a first acute angle relative to the plane defined by said top in said closed position when said projector is in said operable mode; and mounting means for holding a mirror adjacent said top at a second acute angle with the plane defined by said top in said closed position when said projector is in said operable mode;

said mounting means including a mirror bail comprising a member having hooked end portions for captivating opposite edges of said mirror when said projector is in said operating mode, and an intermediate portion including a loop portion, the plane defined by said loop portion being substantially perpendicular to the plane defined by said hooked end portions;

mirror bail support means, secured to the interior of said top near one side thereof, for captivating a portion of said intermediate portion of said mirror bail when said projector is in said operating mode; and mirror bail retention means secured to the interior of said top near the side opposite said one side, having a surface adapted to be captivated by said loop portion of said mirror bail when said projector is in said operable mode.

12. The projector defined in claim 11 further including mirror bail clamp means secured to the interior of said top near said opposite side; said clamp means being adapted to captivate a portion of said intermediate portion of said mirror bail, and said retention means being adapted to be captivated by said loop portion of said mirror bail for storing said bail when said projector is in said transportable mode.

13. An opaque projector characterized by a transportable mode and an operable mode comprising:

case means including end panels, side panels, a base and a top, said top being in a closed position when said projector is in said transportable mode and an open position when said projector is in said operable mode;

mechanical means, cooperating with said top, enabling said top to be maintained in said open position at a first acute angle relative to the plane defined by said top in said closed position when said projector is in said operable mode; and mounting means for holding a mirror adjacent said top at a second acute angle with the plane defined by said top in said closed position when said projector is in said operable mode;

mirror support means having an intermediate section, and a pair of angled terminating sections, each of said terminating sections extending from opposite ends of said intermediate section and being of sufficient size to accomodate the bottom edge of a mirror; and a pair of supports disposed, respectively, adjacent opposite sides of the interior surface of said top, said supports adapted to receive and captivate said terminating sections of said mirror support means.

14. The projector defined in claim 13 wherein said intermediate section of said mirror support means extends above the plane defined by said terminating sections.

15. A method for converting an opaque projector, characterized by case means having end panels, side panels, a base and a top, from a transportable mode to an operable mode comprising the following steps:

moving said top from a closed position to an open position wherein in said open position the plane of said top forms an acute angle with the plane of said top in said closed position;

maintaining said top in said open position;

removing a mirror from a stowed position inside said case means to a mounted position adjacent to said top;

movinhg at least one of said side panels from a closed position wherein said panels define substantially parallel planes substantially perpendicular to said base, to an open position wherein the plane of said one of said side panels forms an acute angle with the plane defined by said one of said side panels when in said closed position.

16. The method defined in claim 15 wherein the step of mounting said mirror includes removing a mirror bail from a stowed position to a mounted position on said top.

17. A method for converting an opaque projector, characterized by case means having end panels, side panels, a base and a top, from a transportable mode to an operable mode comprising the following steps:

moving said top from a closed position to an open position wherein in said open position the plane of said top forms an acute angle with the plane of said top in said closed position;

maintaining said top in said open position;

lowering platen extension means from a raised position substantially coplaner with corresponding side panels, to a lowered position substantially coplaner with a graphic support platen defining a plane substantially parallel to the plane defined by said base.

18. The method defined in claim 17 wherein the step of mounting said mirror includes removing a mirror bail from a stowed position to a mounted position on said top.

*19. An opaque projector characterized by a transportable mode and an operable mode comprising:*

*case means including end panels, side panels, a base, and a top surface;*

*removable mirror;*

*means for mounting said removable mirror adjacent said top surface at an acute angle with respect to said top surface;*

*wherein said side panels are in a closed position when said projector is in said transportable mode, said side panels defining substantially parallel planes substantially perpendicular to said base when in said closed position;*

*at least one of said side panels being movably mounted to said case means, and being adapted to swing to an open position to form an acute angle with the plane defined by said one of said side panels in said closed position, when said projector is in said operable mode;*

*a graphic support platen adjacent said base and extending in a plane substantially parallel to the plane of said base; and*

*means for extending said graphic support platen when said projector is in said operable mode,*

*said platen extension means mounted proximate said graphic support platen and movable between a first, stowed position when said side panels are in said closed position, and a second, extended position substantially coplaner with said graphic support platen when said one of said side panels is in said open position.*

*20. An opaque projector characterized by a transportable mode and an operable mode comprising:*

*case means including end panels, side panels, a base, and a top surface;*

*removable mirror;*

*lens means, having an optical axis, fastened to said case means so that said optical axis is substantially perpendicular to the plane defined by said base;*

*means for mounting said removable mirror proximate said lens such that the plane of said removable mirror is maintained at an acute angle with respect to said optical axis;*

*a graphic support platen adjacent said base and extending substantially parallel to the plane defined thereby;*

*lamp means secured inside said case adapted to illuminate a graphic disposed on said graphic support platen; and*

*platen extension means pivotally mounted adjacent said base along at least one side of said case means,*

*said platen extension means being disposed in a raised position substantially parallel to the plane defined by said side panels when said projector is in said transportable mode, and a lowered position substantially coplaner with said plane when said projector is in said operable mode.*

*21. A method for converting an opaque projector, characterized by case means having end panels, side panels, a base, a top surface, and a removable mirror, from a transportable mode to an operable mode, comprising the following steps:*

*removing said removable mirror from a stowed position inside said case means to a mounted position adjacent to said top surface;*

*moving at least one of said side panels from a closed position wherein said panels define substantially parallel planes substantially perpendicular to said base, to an open position wherein the plane of said one of said side panels forms an acute angle with the plane defined by said side panels when in said closed position.*

*22. A method for converting an opaque projector, characterized by case means having end panels, side panels, a base, a top surface, and a removable mirror, from a transportable mode to an operable mode, comprising the following steps:*

*removing said removable mirror from a stowed position inside said case means to a mounted position adjacent to said top surface;*

*lowering platen extension means from a raised position substantially coplaner with corresponding side panels, to a lowered position substantially coplaner with a graphic support platen defining a plane substantially parallel to the plane defined by said base.*

*23. A method for converting an opaque projector, characterized by case means having end panels, side panels, a base, a top surface, and a removable mirror, from a transportable mode to an operable mode, comprising the following steps:*

*removing said removable mirror from a stowed position inside said case means to a mounted position adjacent to said top surface; and*

*extending platen extension means from a stowed position to an extended position substantially coplanar with a graphic support platen defining a plane substantially parallel to the plane defined by said base.*

* * * * *

UNITED STATES PATENT AND TRADEMARK OFFICE

CERTIFICATE OF CORRECTION

PATENT NO. : Re.32,648

DATED : April 19, 1988

INVENTOR(S) : John R. Montgomery

It is certified that error appears in the above-identified patent and that said Letters Patent is hereby corrected as shown below:

IN THE BACKGROUND OF THE INVENTION

In col. 1, line 40, please delete "3,915,5667" and substitute therefor --3,915,567--.

IN THE DETAILED DESCRIPTION OF THE PREFERRED EMBODIMENT OF THE INVENTION

In col. 3, line 10, please delete "angles" and substitute therefor --angle--.

In col. 4, line 39, please delete "ball" and substitute therefor --bail--.

IN THE CLAIMS

In col. 6, line 66, please delete "include" and substitute therefor --includes--.

In col. 9, line 25, please delete "movinhg" and substitute therefor --moving--.

Signed and Sealed this

Fourteenth Day of August, 1990

*Attest:*

HARRY F. MANBECK, JR.

*Attesting Officer*

*Commissioner of Patents and Trademarks*